United States Patent
Liu

(10) Patent No.: US 9,898,920 B2
(45) Date of Patent: Feb. 20, 2018

(54) SYSTEM AND METHOD FOR PREVENTING LOSS OF ELECTRONIC CIGARETTE CASE

(71) Applicant: HUIZHOU KIMREE TECHNOLOGY CO., LTD. SHENZHEN BRANCH, Shenzhen, Guangdong (CN)

(72) Inventor: Qiuming Liu, Guangdong (CN)

(73) Assignee: HUIZHOU KIMREE TECHNOLOGY CO., LTD. SHENZHEN BRANCH, Shenzhen (CN)

(*) Notice: Subject to any disclaimer, the term of this patent is extended or adjusted under 35 U.S.C. 154(b) by 0 days.

(21) Appl. No.: 15/113,887

(22) PCT Filed: Jan. 24, 2014

(86) PCT No.: PCT/CN2014/071407
§ 371 (c)(1),
(2) Date: Jul. 25, 2016

(87) PCT Pub. No.: WO2015/109542
PCT Pub. Date: Jul. 30, 2015

(65) Prior Publication Data
US 2016/0351044 A1    Dec. 1, 2016

(51) Int. Cl.
*G08B 21/24* (2006.01)
*G08B 13/14* (2006.01)
*H04W 4/00* (2018.01)

(52) U.S. Cl.
CPC ......... *G08B 21/24* (2013.01); *G08B 13/1427* (2013.01); *H04W 4/008* (2013.01)

(58) Field of Classification Search
CPC .... G08B 21/24; G08B 13/1427; H04W 4/008
(Continued)

(56) References Cited

U.S. PATENT DOCUMENTS

| 5,635,897 A * | 6/1997 | Kuo | .................. G08B 13/1427 |
| | | | 340/539.1 |
| 5,661,460 A * | 8/1997 | Sallen | .................. G01S 13/84 |
| | | | 340/539.1 |

(Continued)

FOREIGN PATENT DOCUMENTS

| CN | 201181993 Y | 1/2009 |
| CN | 201266413 Y | 7/2009 |

(Continued)

OTHER PUBLICATIONS

International Search Report of PCT Patent Application No. PCT/CN2014/011407 dated Oct. 29, 2014.

*Primary Examiner* — George Bugg
*Assistant Examiner* — Thang Tran

(57) ABSTRACT

The invention is related to a system and method for preventing a loss of an electronic cigarette case. The system comprises a first receiving and transmitting module, a first alarm module, a first control module, a second receiving and transmitting module and a second control module. The second receiving and transmitting module and the second control module are connected and are arranged together on an electronic cigarette. The first receiving and transmitting module and the first alarm module are respectively connected to the first control module, and are arranged together on the electronic cigarette case used for accommodating an electronic cigarette. The first receiving and transmitting module and the second receiving and transmitting module are in a wireless communication connection within a preset range. The system and method for preventing the loss of the electronic cigarette case has a beneficial effect of preventing the loss of the electronic cigarette case.

8 Claims, 4 Drawing Sheets

(58) Field of Classification Search
USPC .................................................... 340/686.6
See application file for complete search history.

(56) References Cited

U.S. PATENT DOCUMENTS

| | | | | | |
|---|---|---|---|---|---|
| 6,166,642 | A * | 12/2000 | Farshid | ............ | G08B 5/40 340/539.1 |
| 2003/0093247 | A1 * | 5/2003 | Enea | ............ | G08B 13/1427 702/188 |
| 2004/0178907 | A1 * | 9/2004 | Cordoba | ............ | G08B 13/1427 340/539.21 |
| 2011/0221633 | A1 * | 9/2011 | Schramm | ............ | G01S 13/767 342/394 |
| 2012/0227753 | A1 * | 9/2012 | Newton | ............ | A24F 47/008 131/347 |
| 2013/0248385 | A1 * | 9/2013 | Scatterday | ............ | A24F 15/12 206/86 |
| 2013/0298922 | A1 * | 11/2013 | Xiang | ............ | A24F 47/008 131/329 |
| 2014/0258741 | A1 * | 9/2014 | Xiang | ............ | G06F 1/26 713/300 |
| 2014/0291179 | A1 * | 10/2014 | Xiang | ............ | B65D 25/00 206/216 |
| 2014/0305450 | A1 * | 10/2014 | Xiang | ............ | A24F 47/008 131/329 |
| 2015/0015187 | A1 * | 1/2015 | Xiang | ............ | H02J 7/007 320/107 |
| 2015/0114407 | A1 * | 4/2015 | Duncan | ............ | A24F 47/004 131/329 |
| 2015/0181945 | A1 * | 7/2015 | Tremblay | ............ | A24F 47/008 131/328 |
| 2015/0245660 | A1 * | 9/2015 | Lord | ............ | H04W 8/24 131/328 |

FOREIGN PATENT DOCUMENTS

| | | |
|---|---|---|
| CN | 201498089 U | 6/2010 |
| CN | 203152827 U | 8/2013 |
| CN | 203300011 U | 11/2013 |

* cited by examiner

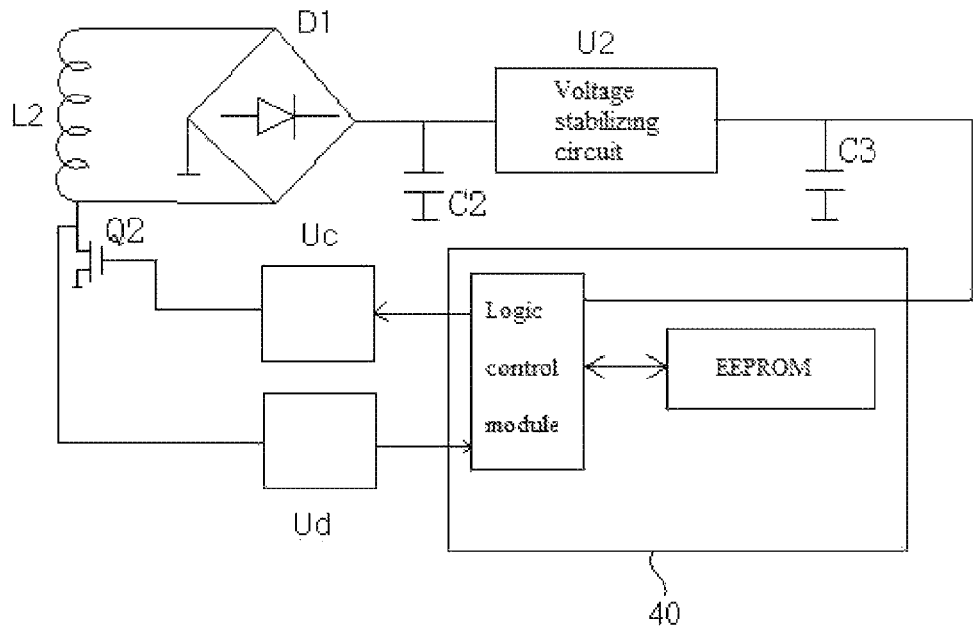

Figure 7

| S1: the first control module controls the first receiving and transmitting module to send out the detection signal according to the predetermined frequency; |
|---|

↓

| S2: the second receiving and transmitting module receives the detection signal and sends the detection signal to the second control module, the second control module sends out the verification signal by the second receiving and transmitting module according to the detection signal; |
|---|

↓

| S3: when the first receiving and transmitting module does not receive the detection signal in predetermined duration after the first receiving and transmitting module sends out the detection signal, the first control module controls the first alarm module to send out alarm notice. |
|---|

Figure 8

SYSTEM AND METHOD FOR PREVENTING LOSS OF ELECTRONIC CIGARETTE CASE

TECHNICAL FIELD

The present application relates to an electronic product, and more particularly relates to a system and method for preventing a loss of an electronic cigarette case.

BACKGROUND

An electronic cigarette in a prior art is generally equipped with a specialized electronic cigarette case. The electronic cigarette case has a function of charging the electronic cigarette. The electronic cigarette case itself is an electronic device. Thus, the electronic cigarette case cannot be discarded after taking out the electronic cigarette, and need to be sustainably used. However, after taking out the electronic cigarette from the electronic cigarette case, people will not usually bring the electronic cigarette case to do other works, and will forget where the electronic cigarette case is after a long time, when they want to put the electronic cigarette back to the electronic cigarette case after using the electronic cigarette, they find that the electronic cigarette case is forgot to somewhere, and it is easy to lose the electronic cigarette case. Therefore, how to solve the problem of losing the electronic cigarette case is becoming a current problem to be solved.

SUMMARY

Aiming at the drawback of easily losing the electronic cigarette case after taking out the electronic cigarette, a system and method for preventing the loss of an electronic cigarette case are provided.

In one aspect, the present invention provides a system for preventing a loss of an electronic cigarette case, the system for preventing the loss of the electronic cigarette case comprises a first receiving and transmitting module, a first alarm module, a first control module, a second receiving and transmitting module and a second control module; the second receiving and transmitting module and the second control module are connected and are arranged together on an electronic cigarette; the first receiving and transmitting module and the first alarm module are respectively connected to the first control module, and are arranged together on an electronic cigarette case used for accommodating the electronic cigarette; the first receiving and transmitting module and the second receiving and transmitting module are in a wireless communication connection within a preset range;

The first control module controls the first receiving and transmitting module to send out a detection signal according to a predetermined frequency, the second receiving and transmitting module is used for receiving a detection signal and sending the detection signal to the second control module, the second control module controls the second receiving and transmitting module to send out a verification signal according to the detection signal; when the first receiving and transmitting module does not receive the verification signal in a predetermined duration after the first receiving and transmitting module sends out the detection signal, the first control module controls the first alarm module to send out an alarm notice.

In the system for preventing the loss of the electronic cigarette case provided in the present invention, the system for preventing the loss of the electronic cigarette case further comprises a second alarm module, the second alarm module and the second control module are connected; when the second receiving and transmitting module does not receive another detection signal in a predetermined duration after receiving a detection signal, the second control module controls the second alarm module to send out the alarm notice.

In the system for preventing loss of electronic cigarette case provided in the present invention, the system for preventing the loss of the electronic cigarette case further comprises a first manual trigger module, the first manual trigger module and the first control module are connected, the first manual trigger module is used for generating a first manual trigger signal and sending the first manual trigger signal to the first control module, the first control module generates a first control signal according to the first manual trigger signal and sends out the first control signal via the first receiving and transmitting module; the second control module receives the first control signal via the second receiving and transmitting module and then controls the second alarm module to send out the alarm notice.

In the system for preventing loss of electronic cigarette case provided in the present invention, the system for preventing the loss of the electronic cigarette case further comprises a second manual trigger module, the second manual trigger module and the second control module are connected, the second manual trigger module is used for generating a second manual trigger signal and sending to the second control module, the second control module generates a second control signal according to the second manual trigger signal and sends out the second control signal via the second receiving and transmitting module; the first control module receives the second control signal via the first receiving and transmitting module and then controls the first alarm module to send out the alarm notice.

In the system for preventing loss of electronic cigarette case provided in the present invention, the electronic cigarette case contains at least two electronic cigarettes, the quantities of the second control module and the second receiving and transmitting module are at least two respectively, every second control module and every second receiving and transmitting module are arranged on every electronic cigarette correspondingly;

the system for preventing loss of electronic cigarette case further comprises a first detection module connected to the first control module, the first detection module is used for detecting whether the electronic cigarette is taken out from the electronic cigarette case, and sending a trigger signal corresponded to the electronic cigarette which is taken out to the first control module when an electronic cigarette is taken out from the electronic cigarette case, the first control module controls the first receiving and transmitting module according the trigger signal to send out the detection signal corresponding to the electronic cigarette which is taken out.

In the system for preventing the loss of the electronic cigarette case provided in the present invention, the first receiving and transmitting module and the second receiving and transmitting module are both radio frequency receiving and transmitting modules.

In the system for preventing the loss of the electronic cigarette case provided in the present invention, the first receiving and transmitting module and the second receiving and transmitting module are both bluetooth receiving and transmitting modules.

In the system for preventing the loss of the electronic cigarette case provided in the present invention, the first receiving and transmitting module comprises a first modulation circuit, a first demodulation circuit, a first inductance coil used as an aerial, a first amplifier element and a first filter capacitor, the first inductance coil, the first amplifier element, the first demodulation circuit and the first control module are in turn connected, the first inductance coil, the first modulation circuit and the first control module are in turn connected; the first filter capacitor is parallel connected to the both ends of the first inductance coil;

the second receiving and transmitting module comprises a second inductance coil used as an aerial, a bridge rectifier circuit, a voltage stabilizing circuit, a second filter capacitor, a third filter capacitor, a second amplifier element, a second modulation circuit and a second demodulation circuit; the second inductance coil, the bridge rectifier circuit, the voltage stabilizing circuit and the power ports of the second control module are in turn connected; the second inductance coil, the second amplifier element, the second demodulation circuit and the second control module are in turn connected; the second inductance coil, the second modulation circuit and the second control module are in turn connected; one end of the second filter capacitor is connected between the bridge rectifier circuit and the voltage stabilizing circuit, the other end of the second filter capacitor is grounded, one end of the third filter capacitor is connected between the voltage stabilizing circuit and the power ports of the second control module, the other end of the third filter capacitor is grounded.

In other aspect, the present invention provides a method for preventing a loss of an electronic cigarette case, comprises following steps:

S1: a first control module controls a first receiving and transmitting module to send out a detection signal according to a predetermined frequency;

S2: a second receiving and transmitting module receives a detection signal and sends the detection signal to a second control module, the second control module sends out a verification signal via a second receiving and transmitting module according to the detection signal;

S3: when the first receiving and transmitting module does not receive the verification signal in a predetermined duration after the first receiving and transmitting module sends out the detection signal, the first control module controls a first alarm module to send out an alarm notice.

The method for preventing the loss of the electronic cigarette case provided in the present invention, in the step S2:

when the second receiving and transmitting module does not receive another detection signal in the predetermined duration after receiving the detection signal, the second control module controls a second alarm module to send out the alarm notice.

In the method for preventing the loss of the electronic cigarette case provided in the present invention, the method for preventing loss of electronic cigarette case further comprises a step S4: a first manual trigger module generates a first manual trigger signal and sends the first manual trigger signal to the first control module, the first control module generates a first control signal according to the first manual trigger signal and sends out the first control signal via the first receiving and transmitting module; the second control module receives the first control signal via the second receiving and transmitting module and then controls the second alarm module to send out the alarm notice.

In the method for preventing the loss of the electronic cigarette case provided in the present invention, the method for preventing loss of electronic cigarette case further comprises a step S5: the second manual trigger module generates a second manual trigger signal and sends to the second control module, the second control module generates a second control signal according to the second manual trigger signal and sends out the second control signal via the second receiving and transmitting module; the first control module receives the second control signal via the first receiving and transmitting module and then controls the first alarm module to send out alarm notice.

In the method for preventing the loss of the electronic cigarette case provided in the present invention, the method for preventing loss of electronic cigarette case further comprises a step S0 before the step S1: the first detection module detects whether the electronic cigarette is taken out from the electronic cigarette case, and sends the trigger signal corresponded to the electronic cigarette which is taken out to the first control module when an electronic cigarette is taken out from the electronic cigarette case;

In the step S1, the first control module controls the first receiving and transmitting module to send out the detection signal according to the predetermined frequency comprises: the first control module controls the first receiving and transmitting module according to the trigger signal to send out the detection signal corresponded to the taken electronic cigarette.

The method for preventing the loss of the electronic cigarette case provided in the present invention, the step S1 further comprises: the second receiving and transmitting module and the second control module are connected and are arranged together on the electronic cigarette; the first receiving and transmitting module and the first alarm module are respectively connected to the first control module, and are arranged together on an electronic cigarette case used for accommodating the electronic cigarette Beneficial effects of implementing the present invention compared to the prior art are: as the system and method for preventing the loss of the electronic cigarette case provided in the present invention adopts arranging the second receiving and transmitting module and the first receiving and transmitting module on the electronic cigarette and the electronic cigarette case respectively, when a distance between the electronic cigarette and the electronic cigarette case is over a preset range and a communication between the first receiving and transmitting module and the second receiving and transmitting module is interrupted, the first alarm module on the electronic cigarette case sends out an alarm notice to remind users, having a beneficial effect of preventing the loss of the electronic cigarette case.

BRIEF DESCRIPTION OF THE DRAWINGS

The invention will be further described with reference to the accompanying drawings and embodiments in the following.

FIG. 7 is a schematic circuit diagram of a first receiving and transmitting module in the first embodiment of the present invention;

FIG. 8 is a process diagram of the method for preventing the loss of the electronic cigarette case in the first embodiment of the present invention.

DETAILED DESCRIPTION OF THE PREFERRED EMBODIMENT

The system and method for preventing a loss of an electronic cigarette case provided in the present invention adopts arranging a second receiving and transmitting module 50 and a first receiving and transmitting module 20 on an electronic cigarette and an electronic cigarette case respectively, when a distance between the electronic cigarette and the electronic cigarette case is over a preset range and a communication between the first receiving and transmitting module 20 and the second receiving and transmitting module 50 is interrupted, the first alarm module 30 on the electronic cigarette case sends out an alarm notice to remind users. The invention will be further described with reference to the accompanying drawings and embodiments in the following.

Figure 1:
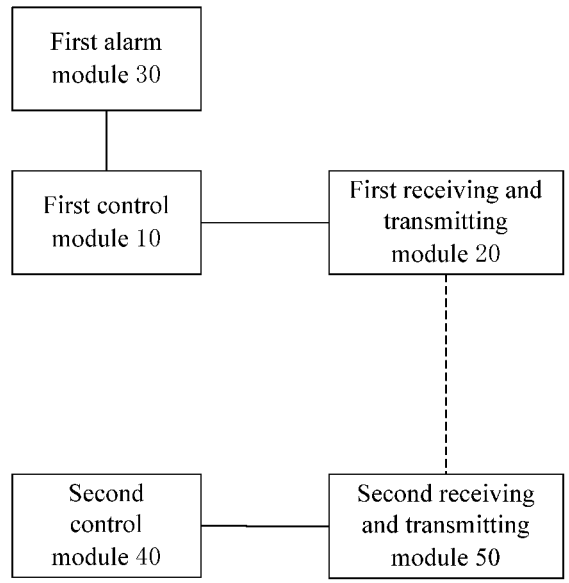
FIG. 1 is a principle diagram of a system for preventing a loss of an electronic cigarette case in a first embodiment of the present invention.

FIG. 1 shows a system for preventing loss of electronic cigarette case in the first embodiment, the system for preventing loss of electronic cigarette case comprises a first alarm module 30, a first control module 10, a first receiving and transmitting module 20, a first alarm module 30, a second control module 40 and a second receiving and transmitting module 50. The second receiving and transmitting module 50 and the second control module 40 are connected and are arranged together on an electronic cigarette. The first control module 10, the first receiving and transmitting module 20 and the first alarm module 30 are in turn connected and are arranged together on an electronic cigarette case used for accommodating the electronic cigarette. The first receiving and transmitting module 20 and the second receiving and transmitting module 50 are in a wireless communication connection within a preset range, such as 8 meters or 10 meters. The communication will be interrupted when exceeding the range.

In this embodiment, the first control module 10 controls the first receiving and transmitting module 20 to send out a detection signal according to a predetermined frequency, such as once every three seconds. The second receiving and transmitting module 50 is used for receiving the detection signal and sending the detection signal to the second control module 40, the second control module 40 controls the second receiving and transmitting module 50 to send out a verification signal according to the detection signal. When the first receiving and transmitting module 20 does not receive the verification signal in predetermined duration after the first receiving and transmitting module 20 sends out the detection signal, the first control module 10 controls the first alarm module 30 to send out an alarm notice, to remind the users of preventing the loss of electronic cigarette case after taking out the electronic cigarette. The alarm notice can be audio notice, flash notice or vibration notice.

In this embodiment, the first receiving and transmitting module 20 and the second receiving and transmitting module 50 are both radio frequency receiving and transmitting modules or bluetooth receiving and transmitting modules. The first control module 10 can be integrated in a microprocessor of the electronic cigarette or can be an independent control chip. The first control module 50 and the electronic cigarette case share the same power source. Certainly, other independent power sources can be adopted.

When the first receiving and transmitting module 20 and the second receiving and transmitting module 50 are both radio frequency receiving and transmitting modules, the first receiving and transmitting module 20 and first control module 10 constitute a read/write device, the second receiving and transmitting module 50 and the second control module 40 constitutes an electronic tag. The first control module 10 controls the first receiving and transmitting module 20 to send a radio frequency detection signal according to the predetermined frequency. When the electronic cigarette is in the preset range of the electronic cigarette case, the electronic tag can receive the detection signal, and then feeds back a verification signal to the read/write device according to the detection signal. The read/write device verifies the feedback signal. When the distance between the first receiving and transmitting module 20 and the second receiving and transmitting module 50 is out of the preset range, the verification signal cannot be received. Thus, when the first control module 10 does not receive the detection signal in a predetermined duration after sending out the detection signal for the first time, the first control module 10 controls the first alarm module 30 to send out the alarm notice.

When the first receiving and transmitting module 20 and the second receiving and transmitting module 50 are both bluetooth receiving and transmitting modules, the first control module 10 and the first receiving and transmitting module 20 constitutes a bluetooth communication module, the second control module 40 and the second receiving and transmitting module 50 constitutes another bluetooth communication module. These two bluetooth communication modules are matched in advance, and when two bluetooth communication modules are out of preset range, the first control module 10 controls the first alarm module 30 to send out the alarm notice.

Figure 6:
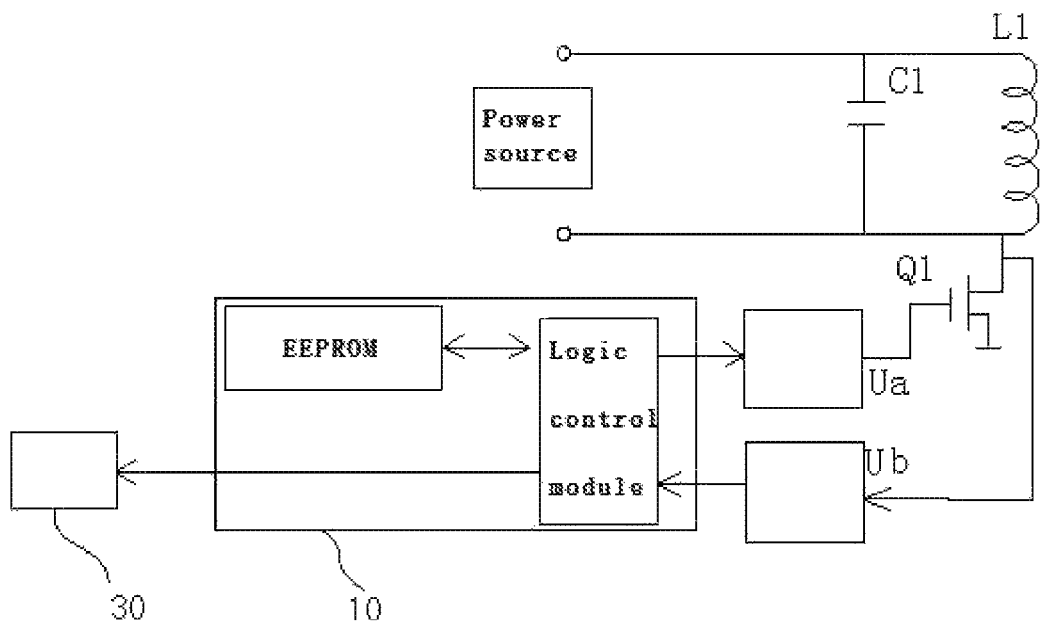
FIG. 6 is a schematic circuit diagram of a first receiving and transmitting module in the first embodiment of the present invention.

As shown in FIG. 6, when the first receiving and transmitting module 20 and the second receiving and transmitting module 50 are both radio frequency receiving and transmitting modules, the first receiving and transmitting module 20 comprises a first modulation circuit Ub, a first demodulation circuit Ua, a first inductance coil L1 used as an aerial, a first amplifier element Q1 and a first filter capacitor C1, the first inductance coil L1, the first amplifier element Q1, the first demodulation circuit Ua and the first control module 10 are in turn connected, the first inductance coil L1, the first modulation circuit Ub and the first control module 10 are in turn connected; the first filter capacitor C1 is parallel connected to the both ends of the first inductance coil L1. The first control module 10 comprises a logic control module and an EEPROM module. The logic control module is used for logic controlling, the EEPROM module is used for storing information.

As show in FIG. 7, the second receiving and transmitting module 50 comprises a second inductance coil L2 used as aerial, the bridge rectifier circuit D1, a voltage stabilizing circuit U2, a second filter capacitor C2, a third filter capacitor C3, a second amplifier element Q2, a second modulation circuit Ud and a second demodulation circuit Uc; the second inductance coil L2, the bridge rectifier circuit D1, the voltage stabilizing circuit U2 and the power ports of the second control module 40 are in turn connected; the second inductance coil L2, the second amplifier element Q2, the second demodulation circuit Uc and the second control module 40 are in turn connected; the second inductance coil L2, the second modulation circuit Ud and the second control module 40 are in turn connected; one end of the second filter capacitor C2 is connected between the power ports of the bridge rectifier circuit D1 and the voltage stabilizing circuit U2, the other end of the second filter capacitor C2 is grounded, one end of the third filter capacitor C3 is connected between the voltage stabilizing circuit U2 and the power ports of the second control module 40, the other end of the third filter capacitor C3 is grounded. The second control module 40 comprises a logic control module and an EEPROM module. The logic control module is used for logic controlling, the EEPROM module is used for storing information.

Figure 2:
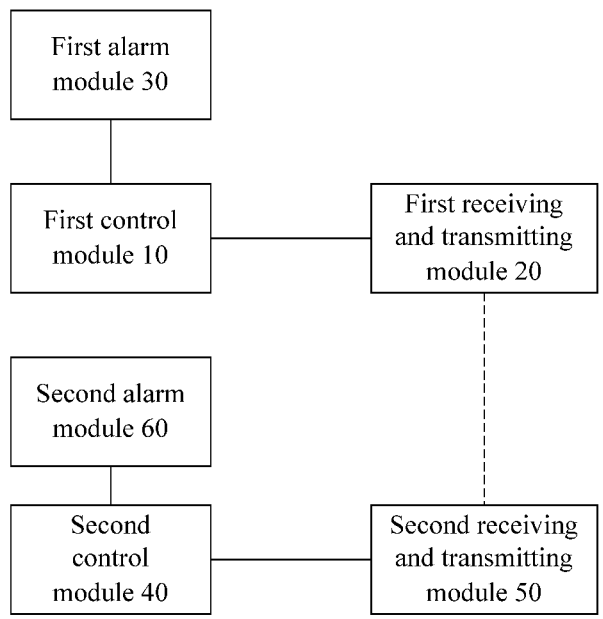
FIG. 2 is a principle diagram of a system for preventing a loss of an electronic cigarette case in a second embodiment of the present invention.

As show in FIG. 2, the second embodiment further comprises a second alarm module 60 based on the first embodiment. When the second receiving and transmitting module 50 does not receive a second detection signal in the predetermined duration after receiving a first detection signal, the second control module 40 controls the second alarm module 60 to send out the alarm notice. The second alarm module 60 can adopt an audio alarm or an optical alarm. The second alarm module 60 makes the electronic cigarette have an alarm function to realize two-way alarm of the electronic cigarette and the electronic cigarette case.

Figure 3:
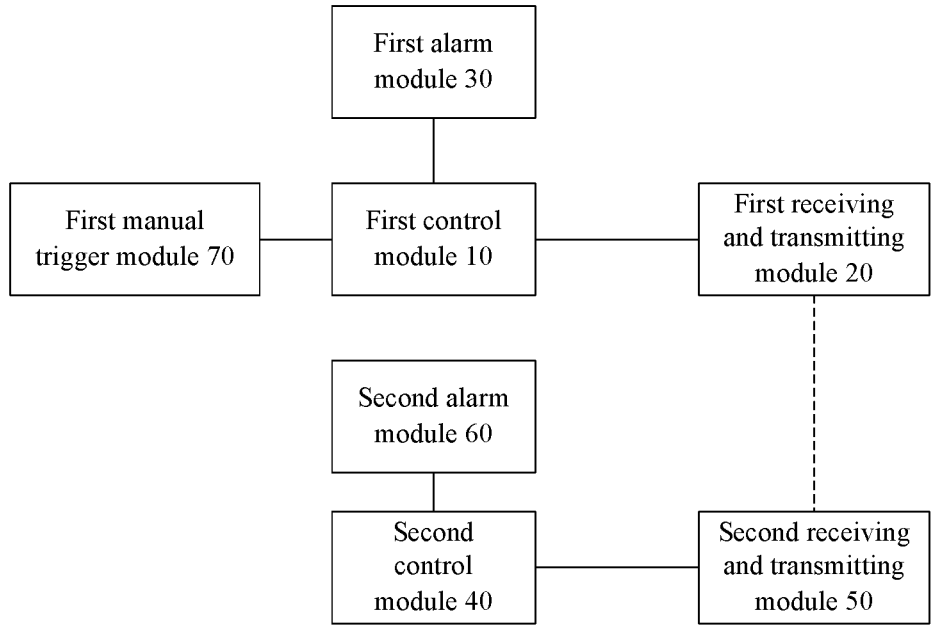
FIG. 3 is a principle diagram of a system for preventing a loss of an electronic cigarette case in a third embodiment of the present invention.

As shown in FIG. 3, the third embodiment further comprises a first manual trigger module 70 based on the second embodiment. The first manual trigger module 70 is arranged on the electronic cigarette case and is connected to the first control module 10. The first manual trigger module 70 can be realized by adopting an electronic key switch or a touch switch. When the user loses the electronic cigarette by accident after using the electronic cigarette, and the electronic cigarette and the electronic cigarette case are in the preset range, the user can press the electronic key switch or touch switch on the electronic cigarette case to make the first manual trigger module 70 generate a first manual trigger signal and send the first manual trigger signal to the first control module 10, the first control module 10 generates a first control signal according to the first manual trigger signal and sends out by the first receiving and transmitting module 20. The second control module 40 receives the first control signal by the second receiving and transmitting module 50 and then controls the second alarm module 60 to send out the alarm notice, to remind the users of a location of the electronic cigarette.

Figure 4:
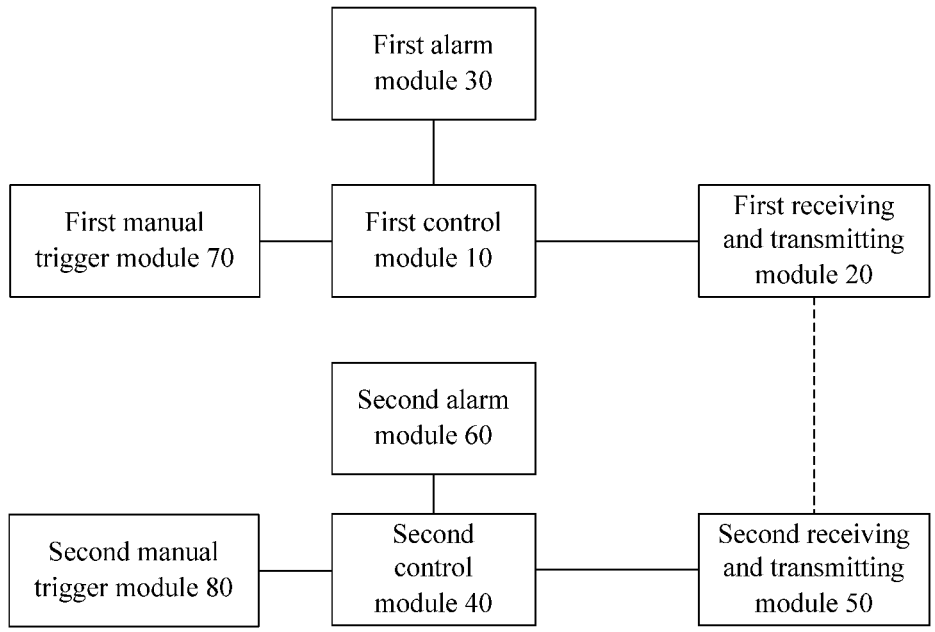
FIG. 4 is a principle diagram of a system for preventing a loss of an electronic cigarette case in a fourth embodiment of the present invention.

As shown in FIG. 4, the fourth embodiment further comprises a second manual trigger module 80 based on the third embodiment. The second manual trigger module 80 is arranged on the electronic cigarette case and is connected to the second control module 40. The second manual trigger module 80 can be realized by adopting an electronic key switch or a touch switch. When the user loses the electronic cigarette by accident after taking out the electronic cigarette, and the electronic cigarette and the electronic cigarette case are in the preset range, the user can press the electronic key switch or touch switch on the electronic cigarette case to make the second manual trigger module 80 generate a second manual trigger signal and send the second manual trigger signal to the second control module 40, the second control module 40 generates a second control signal according to the second manual trigger signal and sends out by the second receiving and transmitting module 50. The first control module 10 receives the second control signal by the first receiving and transmitting module 20 and then controls the first alarm module 30 to send out the alarm notice, to remind the user of the location of the electronic cigarette.

Figure 5:
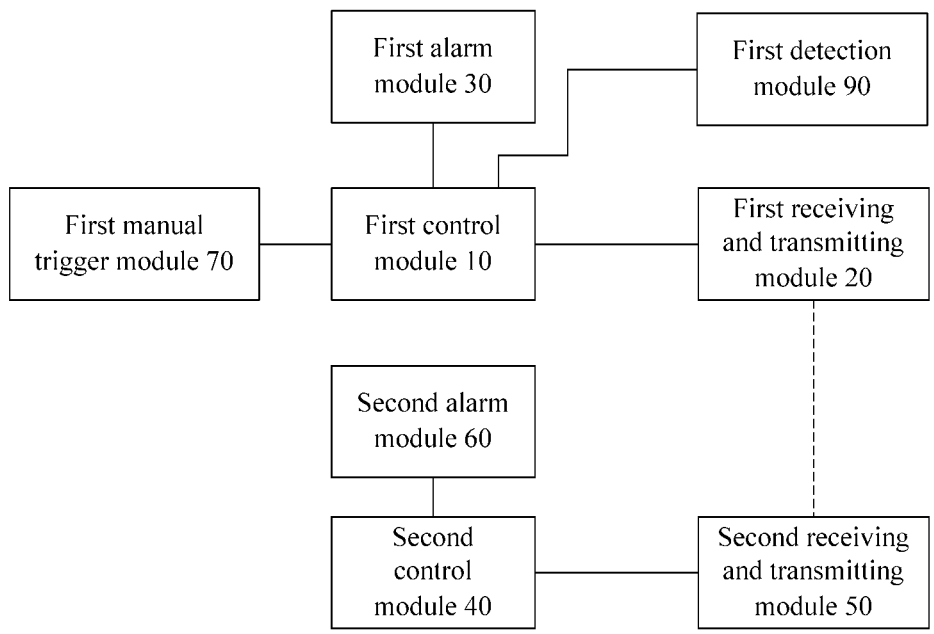
FIG. 5 is a principle diagram of a system for preventing a loss of an electronic cigarette case in a fifth embodiment of the present invention.

When there are multiple electronic cigarettes, users generally will not take out all the electronic cigarettes at one time, so there is always an electronic cigarette in the preset range. Thus, when an electronic cigarette is taken out and the distance between the electronic cigarette and the electronic cigarette case is out of range, the first alarm module 30 on the electronic cigarette case will not generate alarm notice. In order to solve this problem, as shown in FIG. 5, the fifth embodiment further comprises a first detection module 90 based on the third embodiment. The first detection module 90 is arranged on the electronic cigarette case and is connected to the first control module 10. In this embodiment, there are at least two electronic cigarettes. Thus, correspondingly, the quantities of the second control module 40, the second alarm module 60 and the second receiving and transmitting module 50 are at least two. Every electronic cigarette is provided with the second control module 40, the second alarm module 60 and the second receiving and transmitting module 50. The first detection module 90 is used for detecting whether an electronic cigarette is taken out from the electronic cigarette case, and sending a trigger signal corresponded to the taken electronic cigarette to the first control module 10 when an electronic cigarette is taken out from the electronic cigarette case, the first control module 10 controls the first receiving and transmitting module 20 according the trigger signal to send out a detection signal corresponded to the taken electronic cigarette.

Understandably, in this embodiment, the system for preventing loss of electronic cigarette case further comprises the first manual trigger module 70 or the second manual trigger module 80 in the fourth embodiment.

As shown in FIG. 8, a method for preventing loss of electronic cigarette case is provided in the present invention. In the first embodiment, the method for preventing loss of electronic cigarette case comprises following steps:

S1: the first control module 10 controls the first receiving and transmitting module 20 to send out the detection signal according to the predetermined frequency;

S2: the second receiving and transmitting module 50 receives the detection signal and sends the detection signal to the second control module 40, the second control module 40 sends out the verification signal via the second receiving and transmitting module 50 according to the detection signal;

S3: when the first receiving and transmitting module 20 does not receive the verification signal in predetermined duration after the first receiving and transmitting module 20 sends out the detection signal, the first control module 10 controls the first alarm module 30 to send out the alarm notice.

In this embodiment, the second receiving and transmitting module 50 and the second control module 40 are connected and are arranged together on an electronic cigarette. The first receiving and transmitting module 20 and the first alarm module 30 are respectively connected to the first control module 10, and are arranged together on the electronic cigarette case used for accommodating the electronic cigarette;

In the second embodiment, based on the first embodiment, in the step S2, when the second receiving and transmitting module 50 does not receive the detection signal in predetermined duration, it means that the communication of the second receiving and transmitting module 50 and the first receiving and transmitting module 20 is interrupted. The second control module 40 controls the second alarm module 60 to send out the alarm notice.

In the third embodiment, based on the second embodiment, the method for preventing loss of electronic cigarette case further comprises a step S4: the first manual trigger module 70 generates the first manual trigger signal and sends the first manual trigger signal to the first control module 10, the first control module 10 generates the first control signal according to the first manual trigger signal and sends out by the first receiving and transmitting module 20; the second control module 40 receives the first control signal by the second receiving and transmitting module 50 and then controls the second alarm module 60 to send out the alarm notice. The order of the step S4 can be not behind the step S3, and can be in any position.

In the fourth embodiment, based on the third embodiment, the method for preventing loss of electronic cigarette case further comprises a step S5: the second manual trigger module 80 generates the second manual trigger signal and sends to the second control module 40, the second control module 40 generates the second control signal according to the second manual trigger signal and sends out the second control signal by the second receiving and transmitting module 50; the first control module 10 receives the second control signal by the first receiving and transmitting module and then controls the first alarm module 30 to send out the alarm notice. The order of the step S5 can be not behind the step S4, and can be in any position.

In the fifth embodiment, based on the third embodiment, the method for preventing loss of electronic cigarette case further comprises a step S0 before the step S1: the first detection module 90 detects whether an electronic cigarette is taken out from an electronic cigarette case, and sends the trigger signal corresponded to the taken electronic cigarette to the first control module 10 when an electronic cigarette is taken out from the electronic cigarette case.

Correspondingly, in the step S1, the first control module 10 controls the first receiving and transmitting module 20 to send out the detection signal according to the predetermined frequency comprises: the first control module 10 controls the first receiving and transmitting module 20 according to the trigger signal to send out the detection signal corresponded to the taken electronic cigarette.

The system and method for preventing loss of electronic cigarette case provided in the present invention adopt arranging the second receiving and transmitting module 50 and the first receiving and transmitting module 20 on the electronic cigarette and the electronic cigarette case respectively, when the distance between the electronic cigarette and the electronic cigarette case is over a preset range and the communication between the first receiving and transmitting module 20 and the second receiving and transmitting module 50 interrupts, the first alarm module 30 on the electronic cigarette case sends out alarm notice to remind users, having the beneficial effect of preventing loss of electronic cigarette case. Further, the system for preventing loss of electronic cigarette case is further provided with the second alarm module 60, and has the function of two-way alarm. The system for preventing loss of electronic cigarette case is provided with the first manual trigger module 70 and the second manual trigger module 80, thus has the function of helping the user to search the electronic cigarette and the electronic cigarette case. The system for preventing loss of electronic cigarette case is provided with the first detection module 90, thus can be used in the electronic cigarette case with multiple electronic cigarettes.

It should be understood that, for those skilled in the art may make modifications or alternatives according to above instructions, and all these modifications or alternatives are belong to the protection of the present invention.

What is claimed is:

1. A system for preventing a loss of an electronic cigarette case, wherein, comprises a first receiving and transmitting module (20), a first alarm module (30), a first control module (10), a second receiving and transmitting module (50), and a second control module (40); the second receiving and transmitting module (50) and the second control module (40) are connected and are arranged together on an electronic cigarette; the first receiving and transmitting module (20) and the first alarm module (30) are respectively connected to the first control module (10), and are arranged together on the electronic cigarette case used for accommodating the electronic cigarette; the first receiving and transmitting module (20) and the second receiving and transmitting module (50) are in a wireless communication connection within a preset range;

wherein the first control module (10) controls the first receiving and transmitting module (20) to send out a detection signal according to a predetermined frequency, the second receiving and transmitting module (50) is used for receiving the detection signal and sending the detection signal to the second control module (40), the second control module (40) controls the second receiving and transmitting module (50) to send out a verification signal according to the detection signal; when the first receiving and transmitting module (20) does not receive the verification signal which is corresponding to the detection signal in a predetermined duration after the first receiving and transmitting module (20) sends out the detection signal, the first control module (10) controls the first alarm module (30) to send out an alarm notice;

wherein the electronic cigarette case contains at least two electronic cigarettes, the quantities of the second control module (40) and the second receiving and transmitting module (50) are at least two respectively, every second control module (40) and every second receiving and transmitting module (50) are arranged on every electronic cigarette correspondingly;

wherein the system for preventing the loss of the electronic cigarette case further comprises two second alarm modules (60), each second alarm module (60) and each second control module (40) are connected; when the second receiving and transmitting module (50) does not receive another detection signal in the predetermined duration after receiving the detection signal, each second control module (40) controls each second alarm module (60) to send out the alarm notice;

wherein the system for preventing the loss of the electronic cigarette case further comprises a first manual trigger module (70), the first manual trigger module (70) and the first control module (10) are connected, the first manual trigger module (70) is used for generating a first manual trigger signal and sending the first manual trigger signal to the first control module (10), the first control module (10) generates a first control signal according to the first manual trigger signal and sends out the first control signal via the first receiving and transmitting module (20); the second control module (40) receives the first control signal via the second receiving and transmitting module (50) and then controls the second alarm module (60) to send out the alarm notice; and wherein the system for preventing the loss of the electronic cigarette case further comprises a first detection module (90) connected to the first control module (10), the first detection module (90) is used for detecting whether the electronic cigarette is taken out from the electronic cigarette case, and sending a trigger signal which is corresponding to the electronic cigarette which is taken out to the first control module (10) when the electronic cigarette is taken out from the electronic cigarette case, the first control module (10) controls the first receiving and transmitting module (20) according the trigger signal to send out the detection signal which is corresponding to the taken electronic cigarette.

2. The system for preventing the loss of the electronic cigarette case according to claim 1, wherein, the system for preventing the loss of the electronic cigarette case further comprises at least two second manual trigger modules (80), each second manual trigger module (80) and each second control module (40) are connected, the second manual trigger module (80) is used for generating a second manual trigger signal and sending to the second control module (40), the second control module (40) generates a second control signal according to the second manual trigger signal and sends out the second control signal via the second receiving and transmitting module (50); the first control module (10) receives the second control signal via the first receiving and transmitting module (20) and then controls the first alarm module (30) to send out the alarm notice.

3. The system for preventing the loss of the electronic cigarette case according to claim 1, wherein, the first receiving and transmitting module (20) and the second receiving and transmitting module (50) are both radio frequency receiving and transmitting modules.

4. The system for preventing the loss of the electronic cigarette case according to claim 1, wherein, the first receiving and transmitting module (20) and the second receiving and transmitting module (50) are both bluetooth receiving and transmitting modules.

5. The system for preventing the loss of the electronic cigarette case according to claim 3, wherein, the first receiving and transmitting module (20) comprises a first modulation circuit (Ub), a first demodulation circuit (Ua), a first inductance coil (L1) used as an aerial, a first amplifier element (Q1) and a first filter capacitor (C1), the first inductance coil (L1), the first amplifier element (Q1), the first demodulation circuit (Ua) and the first control module (10) are in turn connected, the first inductance coil (L1), the first modulation circuit (Ub) and the first control module (10) are in turn connected; the first filter capacitor (C1) is parallel connected to both ends of the first inductance coil (L1); the second receiving and transmitting module (50) comprises a second inductance coil (L2) used as an aerial, a bridge rectifier circuit (D1), a voltage stabilizing circuit (U2), a second filter capacitor (C2), a third filter capacitor (C3), a second amplifier element (Q2), a second modulation circuit (Ud) and a second demodulation circuit (Uc); the second inductance coil (L2), the bridge rectifier circuit (D1), the voltage stabilizing circuit (U2) and a power port of the second control module (40) are in turn connected; the second inductance coil (L2), the second amplifier element (Q2), the second demodulation circuit (Uc) and the second control module (40) are in turn connected; the second inductance coil (L2), the second modulation circuit (LTd) and the second control module (40) are in turn connected; one end of the second filter capacitor (C2) is connected between the bridge rectifier circuit (D1) and the voltage stabilizing circuit (U2), the other end of the second filter capacitor (C2) is grounded, one end of the third filter capacitor (C3) is connected between the voltage stabilizing circuit (U2) and power ports of the second control module (40), the other end of the third filter capacitor (C3) is grounded.

6. A method for preventing a loss of an electronic cigarette case, wherein, comprises following steps:
S0: a first detection module (90) detects whether an electronic cigarette is taken out from the electronic cigarette case, and sends a trigger signal which is corresponding to the electronic cigarette which is taken out to a first control module (10) when the electronic cigarette is taken out from the electronic cigarette case;
S1: the first control module (10) controls a first receiving and transmitting module (20) to send out a detection signal according to a predetermined frequency;
S2: a second receiving and transmitting module (50) receives the detection signal and sends the detection signal to a second control module (40), the second control module (40) sends out a verification signal via the second receiving and transmitting module (50) according to the detection signal;
S3: when the first receiving and transmitting module (20) does not receive the verification signal which is corresponding to the detection signal in a predetermined duration after the first receiving and transmitting module (20) sends out the detection signal, the first control module (10) controls a first alarm module (30) to send out an alarm notice;
S4: a first manual trigger module (70) generates a first manual trigger signal and sends the first manual trigger signal to the first control module (10), the first control module (10) generates a first control signal according to the first manual trigger signal and sends out the first control signal via the first receiving and transmitting module (20); the second control module (40) receives the first control signal via the second receiving and transmitting module (50) and then controls the second alarm module (60) to send out the alarm notice;
wherein in the step S1, the first control module (10) controls the first receiving and transmitting module (20) to send out the detection signal according to the predetermined frequency comprises: the first control module (10) controls the first receiving and transmitting module (20) according to the trigger signal to send out the detection signal corresponding to the electronic cigarette which is taken out and
wherein in the step S2: when the second receiving and transmitting module (50) does not receive another detection signal in the predetermined duration after receiving the detection signal, the second control module (40) controls a second alarm module (60) to send out the alarm notice.

7. The method for preventing the loss of the electronic cigarette case according to claim 6, wherein the method for preventing the loss of the electronic cigarette case further comprises a step S5: a second manual trigger module (80) generates a second manual trigger signal and sends to the second control module (40), the second control module (40) generates a second control signal according to the second manual trigger signal and sends out the second control signal via the second receiving and transmitting module (50); the first control module (10) receives the second control signal via the first receiving and transmitting module (20) and then controls the first alarm module (30) to send out the alarm notice.

8. The method for preventing the loss of the electronic cigarette case according to claim 6, wherein, the step S1 further comprises: the second receiving and transmitting module (50) and the second control module (40) are connected and are arranged together on the electronic cigarette; the first receiving and transmitting module (20) and the first alarm module (30) are respectively connected to the first control module (10), and are arranged together on the electronic cigarette case used for accommodating the electronic cigarette.

* * * * *